(12) United States Patent
Li et al.

(10) Patent No.: US 9,695,357 B2
(45) Date of Patent: Jul. 4, 2017

(54) NITRIDE PHOSPHORS WITH INTERSTITIAL CATIONS FOR CHARGE BALANCE

(71) Applicant: Intematix Corporation, Fremont, CA (US)

(72) Inventors: Yi-Qun Li, Danville, CA (US); Dejie Tao, Fremont, CA (US); Shengfeng Liu, Newark, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 14/618,219

(22) Filed: Feb. 10, 2015

(65) Prior Publication Data

US 2015/0284629 A1   Oct. 8, 2015

Related U.S. Application Data

(63) Continuation of application No. 13/732,222, filed on Dec. 31, 2012, now Pat. No. 8,951,441.

(60) Provisional application No. 61/582,198, filed on Dec. 30, 2011.

(51) Int. Cl.
   *C09K 11/77*   (2006.01)
   *C09K 11/08*   (2006.01)

(52) U.S. Cl.
   CPC ...... *C09K 11/7734* (2013.01); *C09K 11/0883* (2013.01); *C09K 11/7731* (2013.01)

(58) Field of Classification Search
   CPC .................................................. C09K 11/7734
   See application file for complete search history.

(56) References Cited

U.S. PATENT DOCUMENTS

| | | | |
|---|---|---|---|
| 3,207,583 A | 9/1965 | Brautigam et al. | |
| 6,649,946 B2 | 11/2003 | Bogner et al. | |
| 6,670,748 B2 | 12/2003 | Ellens et al. | |
| 6,956,247 B1 | 10/2005 | Stockman | |
| 7,026,755 B2 | 4/2006 | Setlur et al. | |
| 7,138,756 B2 | 11/2006 | Gotoh et al. | |
| 7,229,573 B2 | 6/2007 | Setlur et al. | |
| 7,252,787 B2 | 8/2007 | Hancu et al. | |
| 7,252,788 B2 | 8/2007 | Nagatomi et al. | |
| 7,258,816 B2 | 8/2007 | Tamaki et al. | |
| 7,311,858 B2 | 12/2007 | Wang et al. | |
| 7,345,418 B2 | 3/2008 | Nagatomi et al. | |
| 7,476,337 B2 | 1/2009 | Sakane et al. | |
| 7,476,338 B2 | 1/2009 | Sakane et al. | |
| 7,507,354 B2 | 3/2009 | Oshio | |
| 7,537,710 B2 | 5/2009 | Oshio | |
| 7,540,977 B2 | 6/2009 | Hirosaki et al. | |
| 7,556,744 B2 | 7/2009 | Tamaki et al. | |
| 7,575,679 B2 | 8/2009 | Sumino et al. | |
| 7,597,823 B2 | 10/2009 | Tamaki et al. | |
| 7,671,529 B2 | 3/2010 | Mueller et al. | |
| 7,700,002 B2 | 4/2010 | Schmidt et al. | |
| 7,713,443 B2 | 5/2010 | Hirosaki et al. | |
| 7,854,859 B2 | 12/2010 | Kameshima et al. | |
| 8,062,549 B2 | 11/2011 | Nagatomi et al. | |
| 8,076,847 B2 | 12/2011 | Tamaki et al. | |
| 8,153,025 B2 | 4/2012 | Schmidt et al. | |
| 8,178,001 B2 | 5/2012 | Kaneda et al. | |
| 8,475,683 B2 | 7/2013 | Li et al. | |
| 8,597,545 B1 | 12/2013 | Liu et al. | |
| 8,663,502 B2 | 3/2014 | Tao et al. | |
| 8,951,441 B2 * | 2/2015 | Li ...................... | C09K 11/7731 252/301.4 F |
| 2005/0189863 A1 | 9/2005 | Nagatomi et al. | |
| 2006/0017365 A1 | 1/2006 | Nagatomi et al. | |
| 2006/0027786 A1 | 2/2006 | Dong et al. | |
| 2006/0145123 A1 | 7/2006 | Cheng et al. | |
| 2006/0255710 A1 | 11/2006 | Mueller-Mach et al. | |
| 2007/0007494 A1 | 1/2007 | Hiosaki et al. | |
| 2007/0029526 A1 | 2/2007 | Cheng et al. | |
| 2007/0040152 A1 | 2/2007 | Oshio | |
| 2007/0182309 A1 | 8/2007 | Wang et al. | |
| 2007/0257596 A1 | 11/2007 | Shimomura et al. | |
| 2008/0001126 A1 | 1/2008 | Hirosaki | |

(Continued)

FOREIGN PATENT DOCUMENTS

| | | |
|---|---|---|
| CN | 1874019 A | 12/2006 |
| CN | 101157854 A | 4/2008 |

(Continued)

OTHER PUBLICATIONS

Search Report and Written Opinion issued in PCT-US2012-072336 on Apr. 22, 2013.

Ruan, J., et al., "Nitrogen Gas Pressure Synthesis and Photoluminescent Properties of Orange-Red SrAlSi4N7:Eu2+ Phosphors for White Light Emitting Diodes", J. Am. Ceram. Soc, 94(2), 2011, pp. 536-542.

Shioi, K., et al., "Synthesis Crystal Structure and Photoluminescence of Sr-α-SiAlON:Eu$^{2+}$", J. Am. Ceramic Soc., 93(2), 2010, pp. 465-469.

(Continued)

*Primary Examiner* — Carol M Koslow

(74) *Attorney, Agent, or Firm* — David H. Jaffer; Pillsbury Winthrop Shaw Pittman LLP

(57) ABSTRACT

Phosphors comprising a nitride-based composition represented by the chemical formula: $M_{(x/v)}(M'_aM''_b)Si_{(c-x)}Al_xN_d$:RE, wherein: M is a divalent or trivalent metal with valence v; M' is at least one divalent metal; M" is at least one trivalent metal; 2a+3b+4c=3d; and RE is at least one element selected from the group consisting of Eu, Ce, Pr, Nd, Sm, Gd, Tb, Dy, Ho, Er, Tm, Yb. Furthermore, the nitride-based composition may have the general crystalline structure of $M'_aM''_bSi_cN_d$, where Al substitutes for Si within the crystalline structure and M is located within the crystalline structure substantially at the interstitial sites.

4 Claims, 8 Drawing Sheets

(56) References Cited

U.S. PATENT DOCUMENTS

| | | |
|---|---|---|
| 2008/0081011 A1 | 4/2008 | Oshio |
| 2008/0116786 A1 | 5/2008 | Wang et al. |
| 2008/0128726 A1 | 6/2008 | Sakata et al. |
| 2008/0143246 A1 | 6/2008 | Hirosaki et al. |
| 2008/0303409 A1 | 12/2008 | Hirosaki et al. |
| 2009/0114929 A1 | 5/2009 | Lee et al. |
| 2009/0166584 A1 | 7/2009 | Shimooka et al. |
| 2009/0243467 A1 | 10/2009 | Shimizu et al. |
| 2009/0251044 A1 | 10/2009 | Shioi |
| 2009/0267485 A1 | 10/2009 | Nagatomi et al. |
| 2009/0283721 A1 | 11/2009 | Liu et al. |
| 2009/0309112 A1 | 12/2009 | Yoshimatsu |
| 2009/0322209 A1 | 12/2009 | Becker et al. |
| 2009/0322990 A1 | 12/2009 | Kawana et al. |
| 2010/0039020 A1 | 2/2010 | Hirosaki |
| 2010/0044729 A1 | 2/2010 | Naum et al. |
| 2010/0052515 A1 | 3/2010 | Watanabe et al. |
| 2010/0085728 A1 | 4/2010 | Seto et al. |
| 2010/0123104 A1 | 5/2010 | Collins et al. |
| 2010/0187974 A1 | 7/2010 | Zhang et al. |
| 2010/0213822 A1 | 8/2010 | Shimooka et al. |
| 2010/0288972 A1 | 11/2010 | Roesler et al. |
| 2010/0296024 A1 | 11/2010 | Ishimaru et al. |
| 2011/0001154 A1 | 1/2011 | Kim et al. |
| 2011/0031874 A1 | 2/2011 | Hosokawa et al. |
| 2011/0176084 A1 | 7/2011 | Akiho et al. |
| 2012/0104929 A1 | 5/2012 | Yeh et al. |
| 2012/0112130 A1 | 5/2012 | Wu et al. |
| 2012/0262904 A1 | 10/2012 | Van Woundenberg et al. |
| 2013/0092964 A1 | 4/2013 | Li et al. |
| 2013/0127332 A1 | 5/2013 | Chen et al. |
| 2013/0168605 A1 | 7/2013 | Li et al. |

FOREIGN PATENT DOCUMENTS

| | | |
|---|---|---|
| CN | 102066522 A | 5/2011 |
| CN | 102433114 A | 5/2012 |
| EP | 1568753 A2 | 8/2005 |
| EP | 1837386 A1 | 9/2007 |
| EP | 1873225 | 1/2008 |
| EP | 1884552 | 2/2008 |
| EP | 1887067 | 2/2008 |
| EP | 2009077 | 12/2008 |
| EP | 2058382 | 5/2009 |
| EP | 2264762 A2 | 12/2010 |
| EP | 2471890 | 7/2012 |
| JP | 2003124527 A | 4/2003 |
| JP | 2004-244560 | 9/2004 |
| JP | 2005-226000 A | 8/2005 |
| JP | 2007169428 A | 7/2007 |
| JP | 2008-163259 A | 7/2008 |
| JP | 4543251 | 7/2010 |
| JP | 2012-046626 A | 3/2012 |
| JP | 2012-069572 | 4/2012 |
| JP | 2012-114333 A | 6/2014 |
| KR | 10-2010-0086964 | 8/2010 |
| WO | WO2008/096300 | 8/2008 |

OTHER PUBLICATIONS

Hecht, Cora "SrALS14N7:EU2+—a Nitridoaluminosilicate Phosphor for Warm White Light . . . ", Chem. Mater, 21, 2009, pp. 1595-1601.

Paio, X., et al., "Synthesis and Luminescent Properties of Low Oxygen Contained $Eu^{2+}$-doped Ca-α-SiAlON Phosphor from Calcium Cyanamide Reduction", Journal of Rare Earths, 26(2), Apr. 2008, pp. 198-202.

Xie, Rong-Jun et al., "Silcon-based oxynitride and nitride phosphors for white LEDs—a review," Science and Technology of Advanced Materials, Oct. 23, 2007, pp. 588-600, vol. 8.

Hampshire, et al., "Silicon Nitride Ceramics—Review of Structure, Processing and Properties," Journal of Achievements in Mats. and Manufacturing Engineering, 24(1), Sep. 2007, pp. 43-50.

Xie, et al., "A Simple, Efficient Synthetic Route to $Sr_2Si_5N_8$:$Eu^{2+}$-based Red Phosphors for White Light-Emitting Diodes", Chem. Mater., 18, 2006, pp. 5578-5583.

Uheda, K. et al., "Luminescence properties of a red phosphor, $CaAlSiN_3$: $Eu^{2+}$, for white light-emitting diodes," Electrochemical and Solid-State Letters, 2006, pp. H22-H25, vol. 9, No. 4.

Paio, X., et al., "Preparation of $(Sr_{1-x}Ca_x)_2Si_5N_8$-$Eu^{2+}$ Solid Solutions and Their Luminescence Properties," J. Electrochem. Soc. 2006, vol. 153, Issue 12, pp. H232-H235.

Li et al., "Luminescence properties of red-emitting $M_2Si_5N_8$:$Eu^{2+}$(M=Ca, Sr, Ba) LED conversion phosphors," J. of Alloys and Compounds, 2006, pp. 273-279, vol. 417.

Hoppe, A., et al., "Luminescence in $Eu^{2+}$-doped $Ba_2Si_5N_8$: Fluorescence, Thermoluminescence, and Upconversion", J. of Phys. Chem. Solids, vol. 61, 2000, pp. 2001-2006.

Van Krevel, J.W.H., On New Rare-Earth Doped M—Si—Al—O—N Materials: Luminescence Properties and Oxidation Resistance, Thesis, Chapters 1-3, 2000, pp. 1-43.

Huang, et al., "Formation of α-$Si_3N_4$ Solid Solutions in the System $Si_3N_4$—AlN—$Y_2O_3$", Comm. of the American Cerm. Soc., Jun. 1983, C96-C97.

Hampshire, "α-Sialon Ceramics", Nature, vol. 274, Aug. 31, 1978, pp. 880-882.

* cited by examiner

NITRIDE PHOSPHORS WITH INTERSTITIAL CATIONS FOR CHARGE BALANCE

CROSS-REFERENCE TO RELATED APPLICATIONS

This application is a continuation of U.S. patent application Ser. No. 13/732,222 filed Dec. 31, 2012, now U.S. Pat. No. 8,951,441, which claims the benefit of U.S. Provisional Application No. 61/582,198 filed Dec. 30, 2011, both of which are incorporated herein by reference in their entirety.

FIELD OF THE INVENTION

Embodiments of the present invention relate generally to nitride phosphors and methods for preparing such phosphors.

BACKGROUND OF THE INVENTION

Many of the red-emitting phosphors are derived from silicon nitride ($Si_3N_4$). The structure of silicon nitride comprises layers of Si and N bonded in a framework of slightly distorted $SiN_4$ tetrahedra. The $SiN_4$ tetrahedra are joined by a sharing of nitrogen corners such that each nitrogen is common to three tetrahedra. See, for example, S. Hampshire in "Silicon nitride ceramics—review of structure, processing, and properties," *Journal of Achievements in Materials and Manufacturing Engineering*, Volume 24, Issue 1, September (2007), pp. 43-50. Compositions of red-emitting phosphors based on silicon nitride often involve substitution of the Si at the center of the $SiN_4$ tetrahedra by elements such as Al; this is done primarily to modify the optical properties of the phosphors, such as the intensity of the emission, and the peak emission wavelength.

There is a consequence of the aluminum substitution, however, which is that since $Si^{4+}$ is being replaced by $Al^{3+}$, the substituted compound has a missing positive charge. Since nature does not allow unbalanced electrical charges in materials, this missing positive charge has to be balanced in some manner. An approach used to achieve charge balance requires the $Al^{3+}$ for $Si^{4+}$ substitution to be accompanied by a substitution of $O^{2-}$ for $N^{3-}$, such that the missing positive charge is counter-balanced with a missing negative charge. This leads to a network of tetrahedra that have either $Al^{3+}$ or $Si^{4+}$ as the cations at the centers of the tetrahedra, and a structure whereby either an $O^{2-}$ or an $N^{3-}$ anion is at the corners of the tetrahedra. Since it is not known precisely which tetrahedra have which substitutions, the nomenclature used to describe this situation is $(Al,Si)_3$—$(N,O)_4$. Clearly, for charge balance there is one O for N substitution for each Al for Si substitution.

Furthermore, these substitutional mechanisms for charge balance—O for N—may be employed in conjunction with an interstitial insertion of a cation. In other words, the cation is inserted between atoms preexisting on crystal lattice sites, into "naturally occurring" holes, interstices, or channels. For example, the use of cations in Sr-containing α-SiAlONs have been discussed by K. Shioi et al. in "Synthesis, crystal structure, and photoluminescence of Sr-α-SiAlON:$Eu^{2+}$," *J. Am. Ceram. Soc.*, 93 [2] 465-469 (2010). Shioi et al. give the formula for the overall composition of this class of phosphors: $M_{m/v}Si_{12-m-n}Al_{m+n}O_nN_{16-n}:Eu^{2+}$, where M is a cation such as Li, Mg, Ca, Y, and rare earths (excluding La, Ce, Pr, and Eu), and v is the valence of the M cation. As taught by Shioi et al., the crystal structure of an α-SiAlON is derived from the compound α-$Si_3N_4$. To generate an α-SiAlON from α-$Si_3N_4$, a partial replacement of $Si^{4+}$ ions by $Al^{3+}$ ions takes place, and to compensate for the charge imbalance created by $Al^{3+}$ substituting for $Si^{4+}$, some O substitutes N and some positive charges are added (what Shioi et al. refer to as "stabilization") by trapping the M cations into the interstices within the network of (Si,Al)—$(O,N)_4$ tetrahedra.

The discovery of the europium doped alkaline earth metal silicon nitride phosphor ($M_2Si_5N_8$ where M is Ca, Sr, or Ba) was made in 2000 by several groups, one of which produced the PhD thesis by J. W. H. van Krevel at the Technical University Eindhoven, January 2000, Osram Opto Semiconductors U.S. Pat. No. 6,649,946, and H. A. Hoppe, et al., J. Phys. Chem. Solids. 2000, 61:2001-2006. This family of phosphors emits at wavelengths from 600 nm to 650 nm with high quantum efficiency. Among them, pure $Sr_2Si_5N_8$ had the highest quantum efficiency and emitted at a peak wavelength of about 620 nm. It is well known that this red nitride phosphor has poor stability under the conditions wherein the LED is operated at a temperature ranging from 60 to 120'C and an ambient humidity ranging from 40 to 90%.

U.S. Pat. No. 8,076,847 (the '847 patent) to Tamaki et al. is directed to a nitride phosphor represented by the general formula $L_xM_yN_{(2/3)X+(4/3)Y}$:R or $L_xM_yO_zN_{(2/3)X+(4/3)Y-(2/3)Z}$:R, wherein L is at least one or more selected from the Group II elements consisting of Mg, Ca, Sr, Ba and Zn, M is at least one or more selected from the Group IV Elements in which Si is essential among C, Si and Ge, and R is at least one or more selected from the rare earth elements in which Eu is essential among Y, La, Ce, Pr, Nd, Sm, Eu, Gd, Tb, Dy, Ho, Er, and Lu. Various embodiments of the patent further contain a Group I[A] element consisting of Li, Na, K, Rb, and Cs. This Group I[A] element functions as a flux during synthesis and not as an interstitial cation for charge balance, the purpose of the flux being to control the particle diameter.

US 2010/0288972 to Roesler et al. teach a $AE_2Si_5N_8$:RE phosphor with a charge compensation mechanism that counters a charge imbalance caused by oxygen, whether introduced intentionally or non-intentionally. If the oxygen is introduced non-intentionally then it is a contamination, but in either event, the charge imbalance caused by the replacement of nitrogen ($N^{3-}$) with oxygen ($O^{2-}$) has to be balanced. Roesler et al. accomplish this in US 2010/0288972 either by the substitutional replacement of silicon ($Si^{4+}$) with a column IIIB element, such as aluminum ($A^{3+}$), or by the replacement of the alkaline earth content originally present in the phosphor (e.g., $Sr^{2+}$ or $Ca^{2+}$) by an alkali metal (such as $Li^+$, $Na^+$, or $K^+$). Note that the authors reported no shift in the peak emission wavelength as a result of the substitutions and charge balancing, and further, no enhanced stability was reported with accelerated environmental stress testing (e.g., temperature and humidity aging).

The forms of charge compensation reported in the art are not believed to render the phosphor more impervious to thermal/humidity aging, nor do they appear to accomplish the beneficial result of increasing the peak emission wavelength with little or substantially no alteration of photoemission intensity.

There is a need for stabilized silicon nitride-based phosphors and stabilized $M_2Si_5N_8$-based phosphors with: peak emission wavelengths over a wider range in the red and also other colors; and with enhanced physical properties of the phosphor, such as temperature and humidity stability.

SUMMARY OF THE INVENTION

Embodiments of the invention generally provide nitride-based phosphors and methods for forming such nitride-based phosphors. The nitride-based phosphors emit fluorescent light in at least the red, orange, yellow and green regions of the electromagnetic spectrum. The nitride-based phosphors may be used in light emitting diode (LED) devices.

In general, the present invention is based on the substitution of Si by Al in $Sr_2Si_5N_8$:RE, $Si_3N_4$:RE, and related phosphor compounds, with Li, Na, K, Mg, Ca, Sr, Y, or other small metal ions and the combinations of these metal ions being incorporated into the crystal lattice substantially at the interstitial sites to provide charge balance—compensating for the charge imbalance due to substitution of Si by Al. The interstitial metal may also contribute to improved thermal and chemical stability of the crystal structure.

Embodiments of the present invention may be described generally as phosphors comprising a nitride-based composition represented by the chemical formula: $M_{(x/v)}(M'_aM''_b)Si_{(c-x)}Al_xN_d$:RE, wherein: M is a monovalent, divalent or trivalent metal with valence v; M' is at least one divalent metal; M'' is at least one trivalent metal; 2a+3b+4c=3d; and RE is at least one element selected from the group consisting of Eu, Ce, Pr, Nd, Sm, Gd, Tb, Dy, Ho, Er, Tm, Yb. Furthermore, the nitride-based composition may have the general crystalline structure of $M'_aM''_bSi_cN_d$, where Al substitutes for Si within the crystalline structure and M is located within the crystalline structure substantially at the interstitial sites. Yet furthermore, M may be selected from the group consisting of Li, Na, K, Ca, Sr, Mg, Ba, Zn, Sc, Y, Lu, La, Ce, Gd, Sm, Pr, Th, and Yb, M' may be selected from the group consisting of Mg, Ca, Sr, Ba, and Zn, and M'' may be selected from the group consisting of Sc, Y, Lu, La, Gd, Th, Sm, Pr, Yb and Bi. Furthermore, x may satisfy $0.01 \leq x \leq 0.6c$. Some examples of compositions according to embodiments of the present invention are: $M_{x/2}M'Si_{1-x}Al_xN_2$:RE; $M_{x/2}M'M''Si_{1-x}Al_xN_3$:RE; $M_{x/2}M''Si_{3-x}Al_xN_5$:RE; $M_{x/2}M'_2M''Si_{2-x}Al_xN_5$:RE; $M_{x/2}M'Si_{4-x}Al_xN_6$:RE; $M_{x/2}M''_4Si_{3-x}Al_xN_8$:RE; $M_{x/2}M'_6Si_{3-x}Al_xN_8$:RE; $M_{x/2}M'_3M''_2Si_{3-x}Al_xN_8$:RE; $M_{x/2}M''_3Si_{3-x}Al_xN_7$:RE; $M_{x/2}M'_3M''Si_{3-x}Al_xN_7$:RE; $M_{x/2}M'_2M''Si_{5-x}Al_xN_9$:RE; $M_{x/2}M'M''_3Si_{4-x}Al_xN_9$:RE; $M_{x/2}M''Si_{6-x}Al_xN_9$:RE; $M_{x/2}M''_3Si_{6-x}Al_xN_{11}$:RE; and $M_{x/2}M'M''Si_{5-x}Al_xN_{11}$:RE.

In one embodiment, a phosphor (e.g., a red phosphor) containing a nitride-based compound is represented by the chemical formula $Eu_x(Ca_{x''}Sr_{(1-x'')})_{(2+0.5x-x')}Si_{(5-x)}Al_xN_8$, (note that this formula may be rewritten in the format of the general formula, $M_{(x/v)}(M'_aM''_b)Si_{(c-x)}Al_xN_d$:RE, as $Ca_{0.5x}(Ca_{x''}Sr_{1-x''})_{2-x}Eu_xSi_{5-x}Al_xN_8$, similarly all formulas provided herein may be rewritten in this format) wherein $0.1 \leq x \leq 1.3$, $0.00001 \leq x' \leq 0.2$, and $0 \leq x'' \leq 1$, Al substitutes for Si within the crystalline structure, and the Ca charge balance cations are located within the crystalline structure substantially at the interstitial sites. In some examples, the chemical formula $Eu_x(Ca_{x''}Sr_{(1-x'')})_{(2+0.5x-x')}Si_{(5-x)}Al_xN_8$ is more narrowly represented wherein $0.3 \leq x \leq 1.3$, $0.0001 \leq x' \leq 0.1$, and $0.05 \leq x'' \leq 0.4$, more narrowly wherein $0.5 \leq x \leq 1.3$, $0.001 \leq x' \leq 0.1$, and $0.1 \leq x'' \leq 0.3$, and more narrowly wherein $0.7 \leq x \leq 1.3$, for example, wherein $1.0 \leq x \leq 1.3$ or wherein $1.05 \leq x \leq 1.25$.

The nitride-based compounds of the phosphor may have a crystalline structure with a single phase or a mixed phase and include a 2-5-8 phase in pure or mixed form. The nitride-based compounds described herein distinguish previous nitride phosphors having a 1-1-1-3 phase or CASN phase (e.g., $CaSiAlN_3$)—which generally have the space group $Cmc2_1$. Generally, the crystalline structures of the 2-5-8 nitride-based compounds as described herein have a space group selected from $Pmn2_1$, Cc, derivatives thereof, or mixtures thereof. In some examples, the space group is $Pmn2_1$.

In another embodiment, a phosphor (e.g., a red phosphor) containing a nitride-based compound is represented by the chemical formula $RE_x(Ca_{x''}Sr_{(1-x'')})_{(2+0.5x-x')}Si_{(5-x)}Al_xN_8$, wherein RE is at least one element selected from Eu, Ce, Pr, Nd, Sm, Gd, Tb, Dy, Ho, Er, Tm, Yb, or combinations thereof, $0.1 \leq x \leq 3$, $0.00001 \leq x' \leq 0.2$, and $0 \leq x'' \leq 1$, and the nitride-based compound has a crystalline structure having a space group selected from $Pmn2_1$, Cc, derivatives thereof, or mixtures thereof, Al substitutes for Si within the crystalline structure, and the Ca charge balance cations are located within the crystalline structure substantially at the interstitial sites. A phosphor activator is represented by RE which contains one element, two elements, or more elements for activating the nitride-based compound of the phosphor. In some examples, the phosphor activator contains Eu and at least one or more elements. Therefore, the RE is Eu and one or more elements selected from Ce, Pr, Nd, Sm, Gd, Tb, Dy, Ho, Er, Tm, Yb, or combinations thereof. In some examples, the chemical formula $RE_x(Ca_{x''}Sr_{(1-x'')})_{(2+0.5x-x')}Si_{(5-x)}Al_xN_8$ is more narrowly represented wherein $0.3 \leq x \leq 2.5$, $0.0001 \leq x' \leq 0.1$, and $0 \leq x'' \leq 1$, more narrowly wherein $1 \leq x \leq 2$, $0.001 \leq x' \leq 0.1$, and $0.05 \leq x'' \leq 0.4$, more narrowly wherein x=2, $0.001 \leq x' \leq 0.1$, and $0.1 \leq x'' \leq 0.3$.

In another embodiment, a phosphor (e.g., a red phosphor) containing a nitride-based compound is represented by the chemical formula $Eu_x(Ca_{x''}Sr_{(1-x'')})_{(2+0.5x-x')}Si_{(5-x)}Al_xN_8$, wherein $0.1 \leq x \leq 3$, $0.00001 \leq x' \leq 0.2$, and $0 \leq x'' \leq 1$, and the nitride-based compound has a crystalline structure having a space group selected from $Pmn2_1$, Cc, derivatives thereof, or mixtures thereof, Al substitutes for Si within the crystalline structure, and the Ca charge balance cations are located within the crystalline structure substantially at the interstitial sites. In another embodiment, a phosphor (e.g., a red phosphor) containing a nitride-based compound is represented by the chemical formula $Eu_x(Ca_{x''}Sr_{(1-x'')})_{(3-x')}Si_3Al_2N_8$, wherein $0.00001 \leq x' \leq 0.2$, and $0 \leq x'' \leq 1$, and the nitride-based compound has a crystalline structure having a space group selected from $Pmn2_1$, Cc, derivatives thereof, or mixtures thereof, Al substitutes for Si within the crystalline structure, and the Ca charge balance cations are located within the crystalline structure substantially at the interstitial sites.

In another embodiment, a phosphor (e.g., an orange phosphor) containing a nitride-based compound is represented by the chemical formula $RE_xCa_{(0.5x-x')}Si_{(3-x)}Al_xN_4$, wherein RE is at least one element selected from Eu, Ce, Pr, Nd, Sm, Gd, Tb, Dy, Ho, Er, Tm, Yb, or combinations thereof, $0.1 < x < 3$, and $0.0001 \leq x' \leq 0.2$, and wherein the nitride-based compound has the general crystalline structure of $\alpha$-$Si_3N_4$ (i.e. an $\alpha$-$Si_3N_4$ structure), Al substitutes for Si within said crystalline structure, and the Ca atoms are located within the crystalline structure substantially at the interstitial sites. In some examples, the chemical formula $RE_xCa_{(0.5x-x')}Si_{(3-x)}Al_xN_4$ is more narrowly represented wherein $0.1 < x < 3$ and $0.0001 \leq x' \leq 0.2$, more narrowly wherein $0.2 \leq x \leq 2$ and $0.001 \leq x' \leq 0.1$, more narrowly wherein $0.3 \leq x \leq 1.8$ and $0.005 \leq x' \leq 0.1$, and more narrowly wherein $0.3 \leq x \leq 1.8$ and $x'=0.03$.

In another embodiment, a phosphor (e.g., a green phosphor) containing a nitride-based compound is represented by the chemical formula $RE_xSr_{(0.5x-x')}Si_{(3-x)}Al_xN_4$, wherein RE is at least one element selected from Eu, Ce, Pr, Nd, Sm, Gd, Tb, Dy, Ho, Er, Tm, Yb, or combinations thereof, $0.1 < x < 3$, and $0.0001 \leq x' \leq 0.2$, and wherein said nitride-based compound has the general crystalline structure of $\alpha$-$Si_3N_4$, Al substitutes for Si within said crystalline structure, and the Sr atoms are located within the crystalline structure substantially at the interstitial sites. In some examples, the chemical formula $RE_xSr_{(0.5x-x')}Si_{(3-x)}Al_xN_4$ is more narrowly represented wherein $0.1<x<3$ and $0.0001 \leq x' \leq 0.2$, more narrowly wherein $0.2 \leq x \leq 2$ and $0.001 \leq x' \leq 0.1$, more narrowly wherein $0.3 \leq x \leq 1.8$ and $0.005 \leq x' \leq 0.1$, and more narrowly wherein $0.3 \leq x \leq 1.8$ and $x'=0.03$.

Methods for preparing the nitride-based phosphors of the present invention are disclosed herein.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

Figure 1:
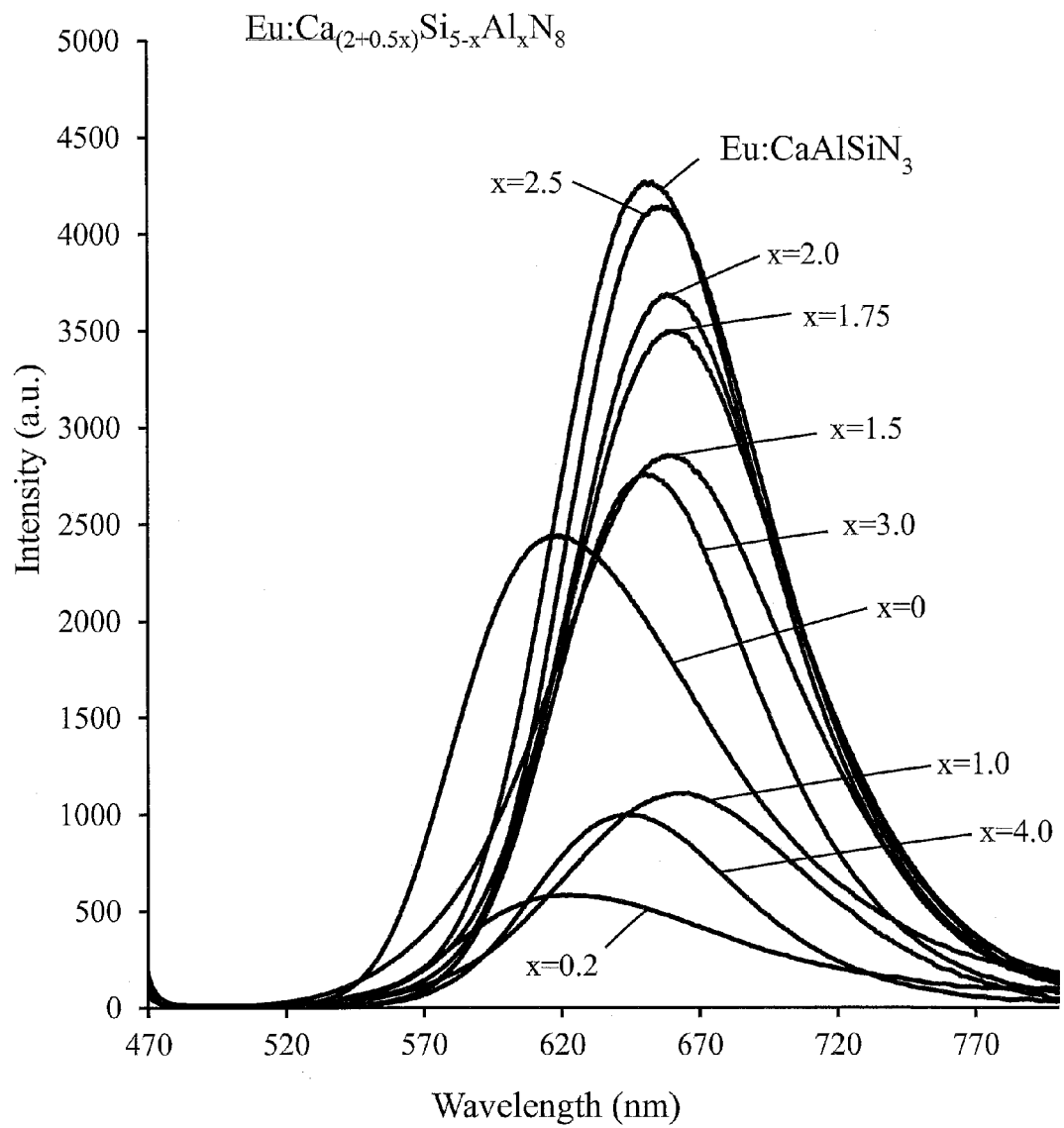
FIG. 1 depicts an emission spectra of $Eu:Ca_{(2+0.5x)}Si_{(5-x)}Al_xN_8$ with different x values, as described by embodiments herein.

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Embodiments of the invention generally provide nitride-based phosphors and methods for forming such nitride-based phosphors. The nitride-based phosphors emit fluorescent light in at least the red, orange, and green regions of the electromagnetic spectrum. The nitride-based phosphors may be used in light emitting diode (LED) devices.

In general, the present invention is based on the substitution of Si by Al in $Sr_2Si_5N_8$:RE, $Si_3N_4$:RE, and related phosphor compounds, with Li, Na, K, Mg, Ca, Sr, Y, or other small metal ions and the combinations of these metal ions being incorporated substantially at the interstitial sites into the crystal lattice to provide charge balance—compensating for the charge imbalance due to substitution of Si by Al. The interstitial metal may also contribute to improved thermal and chemical stability of the crystal structure. The substitution and charge balance is effected while maintaining the same general crystal structure of the unsubstituted material. (Note that in materials science theory the vacancy density of a pure crystalline material may be on the order of a hundred parts per million of the existing lattice sites depending on the thermal equilibrium conditions of the crystal. As such, a small percentage of the charge balance ions may actually end up in vacant metal ion sites, rather than the interstitial sites—the charge balance ions filling the vacancies before the interstitial sites.)

Support for this proposed structure of the phosphor material is found in the literature for ceramic materials with an α-silicon nitride crystal structure. For example, see Hampshire et al. "α'-Sialon ceramics", Nature 274, 880 (1978) and Huang et al. "Formation of α-$Si_3N_4$ Solid Solutions in the System $Si_3N_4$—AlN—$Y_2O_3$" J. Amer. Ceram. Soc. 66 (6), C-96 (1983). These articles state that it is known that the α-silicon nitride unit cell contains two interstitial sites large enough to accommodate other atoms or ions. Furthermore, the α'-sialon structure is derived from the α-silicon nitride structure by partial replacement of Si with Al, and valency compensation is effected by cations—such as Li, Ca, Mg and Y—occupying the interstices of the (Si,Al)—N network, and also by oxygen replacing nitrogen when an oxide is used. (The α'-sialon structure is represented by $M_x(Si,Al)_{12}(O,N)_{16}$, where x is not greater than 2.) Yet furthermore, it is accepted that the α'-sialon structure requires the equivalent of at least half a cationic valency in each of the two interstices within the unit cell to stabilize the structure.

Embodiments of the present invention may be described generally as phosphors comprising a nitride-based composition represented by the chemical formula: $M_{(x/v)}(M'_aM''_b)Si_{(c-x)}Al_xN_d$:RE, wherein: M is a monovalent, divalent or trivalent metal with valence v; M' is at least one divalent metal; M" is at least one trivalent metal; $2a+3b+4c=3d$; and RE is at least one element selected from the group consisting of Eu, Ce, Pr, Nd, Sm, Gd, Tb, Dy, Ho, Er, Tm, Yb. Furthermore, the nitride-based composition may have the general crystalline structure of $M'_aM''_bSi_cN_d$, where Al substitutes for Si within the crystalline structure and M is located within the crystalline structure substantially at the interstitial sites. Yet furthermore, M may be selected from the group consisting of Li, Na, K, Ca, Sr, Mg, Ba, Zn, Sc, Y, Lu, La, Ce, Gd, Sm, Pr, Tb, and Yb, M' may be selected from the group consisting of Mg, Ca, Sr, Ba, and Zn, and M" may be selected from the group consisting of Sc, Y, Lu, La, Gd, Tb, Sm, Pr, Yb and Bi. Furthermore, x may satisfy $0.01 \leq x \leq 0.6c$. Some examples of compositions according to embodiments of the present invention are: $M_{x/2}M'Si_{1-x}Al_xN_2$:RE; $M_{x/2}M'M''Si_{1-x}Al_xN_3$:RE; $M_{x/2}M''Si_{3-x}Al_xN_5$:RE; $M_{x/2}M'_2M''Si_{2-x}Al_xN_5$:RE; $M_{x/2}M'Si_{4-x}Al_xN_6$:RE; $M_{x/2}M''_4Si_{3-x}Al_xN_8$:RE; $M_{x/2}M'_6Si_{3-x}Al_xN_8$:RE; $M_{x/2}M'_3M''_2Si_{3-x}Al_xN_8$:RE; $M_{x/2}M''_3Si_{3-x}Al_xN_7$:RE; $M_{x/2}M'_3M''Si_{3-x}Al_xN_7$:RE; $M_{x/2}M'_2M''Si_{5-x}Al_xN_9$:RE;

$M_{x/2}M'M''_3Si_{4-x}Al_xN_9$:RE; $M_{x/2}M''Si_{6-x}Al_xN_9$:RE; $M_{x/2}M''_3Si_{6-x}Al_xN_{11}$:RE; and $M_{x/2}M'M''Si_{5-x}Al_xN_{11}$:RE.

Some specific embodiments of the present invention that are based on 2-5-8 compositions (a=2, b=0, c=5 and d=8), such as $Sr_2Si_5N_8$:RE, are as follows.

$RE_x(Ca_{x''}Sr_{(1-x'')})_{(2+0.5x-x')}Si_{(5-x)}Al_xN_8$ for Red and Other Phosphors In one embodiment, a phosphor (e.g., a red phosphor) containing a nitride-based compound is represented by the chemical formula $Eu_x(Ca_{x''}Sr_{(1-x'')})_{(2+0.5x-x')}Si_{(5-x)}Al_xN_8$, (note that this formula may be rewritten in the format of the general formula, $M_{(x/v)}(M'_aM''_b)Si_{(c-x)}Al_xN_d$:RE, as $Ca_{0.5x}(Ca_{x''}Sr_{1-x''})_{2-x'}Eu_xSi_{5-x}Al_xN_8$, similarly all formulas provided herein may be rewritten in this format) wherein $0.1 \leq x \leq 1.3$, $0.00001 \leq x' \leq 0.2$, and $0 \leq x'' \leq 1$, Al substitutes for Si within the crystalline structure, and the Ca charge balance cations are located within the crystalline structure substantially at the interstitial sites. In some examples, the chemical formula $Eu_x(Ca_{x''}Sr_{(1-x'')})_{(2+0.5x-x')}Si_{(5-x)}Al_xN_8$ is more narrowly represented wherein $0.3 \leq x \leq 1.3$, $0.0001 \leq x' \leq 0.1$, and $0.05 \leq x'' \leq 0.4$, more narrowly wherein $0.5 \leq x \leq 1.3$, $0.001 \leq x' \leq 0.1$, and $0.1 \leq x'' \leq 0.3$, and more narrowly wherein $0.7 \leq x \leq 1.3$, for example, wherein $1.0 \leq x \leq 1.3$ or wherein $1.05 \leq x \leq 1.25$.

The nitride-based compounds of the phosphor may have a crystalline structure with a single phase or a mixed phase and include a 2-5-8 phase in pure or mixed form. The nitride-based compounds described herein distinguish previous nitride phosphors having a 1-1-1-3 phase or CASN phase (e.g., $CaSiAlN_3$)—which generally have the space group $Cmc2_1$. Generally, the crystalline structures of the 2-5-8 nitride-based compounds as described herein have a space group selected from $Pmn2_1$, Cc, derivatives thereof, or mixtures thereof. In some examples, the space group is $Pmn2_1$.

In embodiments described herein, the phosphors are enabled to emit a fluorescent light at a desired or predetermined wavelength when irradiated with an excitation source. (Herein an excitation source is typically a blue excitation source having a wavelength ranging from about 420 nm to about 470, although the excitation source may have a wider range from about 250 nm to about 420 nm; a common blue excitation source is a InGaN LED, or GaN LED, emitting with a peak wavelength of about 460 nm.) The phosphor containing $Eu_x(Ca_{x''}Sr_{(1-x'')})_{(2+0.5x-x')}Si_{(5-x)}Al_xN_8$ is generally enabled to emit a red fluorescent light, although the phosphor is also enabled to emit a fluorescent light of other colors. The fluorescent light emitted by the phosphor containing $Eu_x(Ca_{x''}Sr_{(1-x'')})_{(2+0.5x-x')}Si_{(5-x)}Al_xN_8$ may have a peak emission wavelength within a range from about 600 nm to about 675 nm under an excitation wavelength within a range from about 400 nm to about 480 nm. In some examples, the peak emission wavelength is within a range from about 610 nm to about 640 nm, more narrowly within a range from about 620 nm to about 625 nm. In other examples, the peak emission wavelength is within a range from about 630 nm to about 660 nm, more narrowly within a range from about 640 nm to about 655 nm.

In another embodiment, a phosphor (e.g., a red phosphor) containing a nitride-based compound is represented by the chemical formula $RE_x(Ca_{x''}Sr_{(1-x'')})_{(2+0.5x-x')}Si_{(5-x)}Al_xN_8$, wherein RE is at least one element selected from Eu, Ce, Pr, Nd, Sm, Gd, Tb, Dy, Ho, Er, Tm, Yb, or combinations thereof, $0.1 \leq x \leq 3$, $0.00001 \leq x' \leq 0.2$, and $0 \leq x'' \leq 1$, and the nitride-based compound has a crystalline structure having a space group selected from $Pmn2_1$, Cc, derivatives thereof, or mixtures thereof, Al substitutes for Si within the crystalline structure, and the Ca charge balance cations are located within the crystalline structure substantially at the interstitial sites. A phosphor activator is represented by M which contains one element, two elements, or more elements for activating the nitride-based compound of the phosphor. In some examples, the phosphor activator contains Eu and at least one or more elements. Therefore, the M is Eu and one or more elements selected from Ce, Pr, Nd, Sm, Gd, Tb, Dy, Ho, Er, Tm, Yb, or combinations thereof. In some examples, the chemical formula $RE_x(Ca_{x''}Sr_{(1-x'')})_{(2+0.5x-x')}Si_{(5-x)}Al_xN_8$ is more narrowly represented wherein $0.3 \leq x \leq 2.5$, $0.0001 \leq x' \leq 0.1$, and $0 \leq x'' \leq 1$, more narrowly wherein $1 \leq x \leq 2$, $0.001 \leq x' \leq 0.1$, and $0.05 \leq x'' \leq 0.4$, more narrowly wherein $x=2$, $0.001 \leq x' \leq 0.1$, and $0.1 \leq x'' \leq 0.3$.

In another embodiment, a phosphor (e.g., a red phosphor) containing a nitride-based compound is represented by the chemical formula $Eu_x(Ca_{x''}Sr_{(1-x'')})_{(2+0.5x-x')}Si_{(5-x)}Al_xN_8$, wherein $0.1 \leq x \leq 3$, $0.00001 \leq x' \leq 0.2$, and $0 \leq x'' \leq 1$, and the nitride-based compound has a crystalline structure having a space group selected from $Pmn2_1$, Cc, derivatives thereof, or mixtures thereof, Al substitutes for Si within the crystalline structure, and the Ca charge balance cations are located within the crystalline structure substantially at the interstitial sites. In some examples, the chemical formula $Eu_x(Ca_{x''}Sr_{(1-x'')})_{(2+0.5x-x')}Si_{(5-x)}Al_xN_8$ is more narrowly represented wherein $0.5 \leq x \leq 2.5$, $0.0001 \leq x' \leq 0.1$, and $0 \leq x'' \leq 1$, more narrowly wherein $1 \leq x \leq 2$, $0.001 \leq x' \leq 0.1$, and $0.05 \leq x'' \leq 0.4$, and more narrowly wherein $x=2$, $0.001 \leq x' \leq 0.1$, and $0.1 \leq x'' \leq 0.3$. In other examples, the chemical formula $Eu_{x'}(Ca_{x''}Sr_{(1-x'')})_{(2+0.5x-x')}Si_{(5-x)}Al_xN_8$ is more narrowly represented wherein $0.1 \leq x \leq 1.3$, $0.0001 \leq x' \leq 0.1$, and $0.05 \leq x'' \leq 0.4$, and more narrowly wherein $0.5 \leq 1.3$, $0.001 \leq x' \leq 0.1$, and $0.1 \leq x'' \leq 0.3$.

In another embodiment, a phosphor (e.g., a red phosphor) containing a nitride-based compound is represented by the chemical formula $Eu_x(Ca_{x''}Sr_{(1-x'')})_{(3-x')}Si_3Al_2N_8$, wherein $0.00001 \leq x' \leq 0.2$, and $0 \leq x'' \leq 1$, and the nitride-based compound has a crystalline structure having a space group selected from $Pmn2_1$, Cc, derivatives thereof, or mixtures thereof, Al substitutes for Si within the crystalline structure, and the Ca charge balance cations are located within the crystalline structure substantially at the interstitial sites. In some examples, the chemical formula $Eu_x(Ca_{x''}Sr_{(1-x'')})_{(3-x')}Si_3Al_2N_8$ is more narrowly represented wherein $0.0001 \leq x' \leq 0.1$, and $0.05 \leq x'' \leq 0.4$, more narrowly wherein $0.001 \leq x' \leq 0.1$, and $0.1 \leq x'' \leq 0.3$, and more narrowly wherein $0.001 \leq x' \leq 0.1$, and $0.1 \leq x'' \leq 0.3$.

FIG. 1 depicts an emission spectra of $Eu:Ca_{(2+0.5x)}Si_{(5-x)}Al_xN_8$ with different x values, as described by embodiments herein. When the value of x increases, the emission peak shifts to longer wavelength. The emission peak intensity drops first, then increases with the increasing x value to reach the highest intensity when x=2.5. Therefore, the phosphor with the chemical formula $Eu:Ca_{3.25}Si_{2.5}Al_{2.5}N_8$ has the highest intensity which approaches the intensity of $Eu:CaAlSiN_3$ phosphor. The phosphor with the chemical formula $Eu:Ca_{3.25}Si_{2.5}Al_{2.5}N_8$ contains 2.5 moles of silicon, 2.5 moles of aluminum, and 3.25 moles of calcium.

Figure 2A:
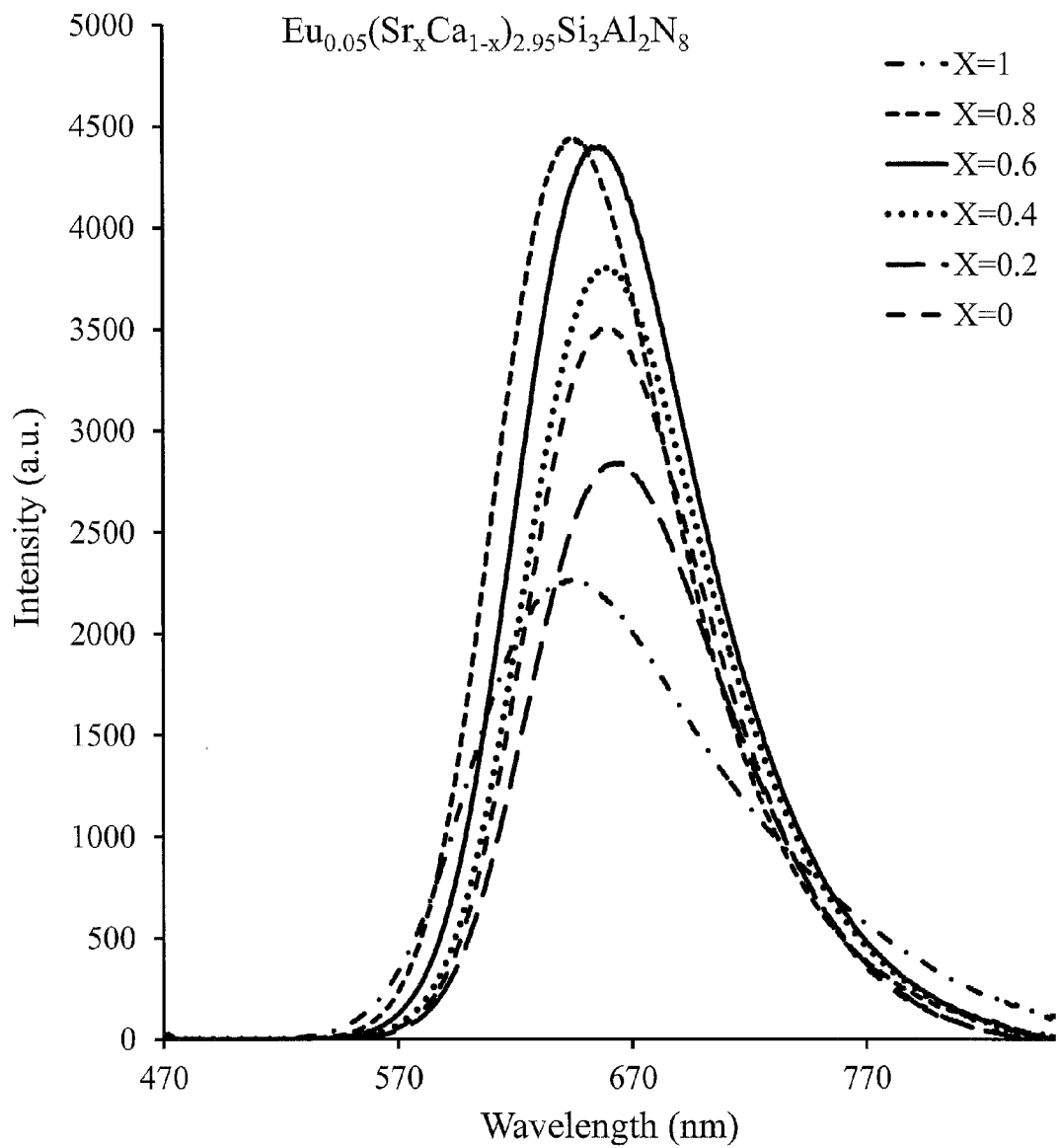
FIGS. 2A-2B depict emission spectra of $Eu_{0.05}(Sr_xCa_{(1-x)})_{2.95}Si_3Al_2N_8$, with different x values, as described by embodiments herein.
Figure 2B:
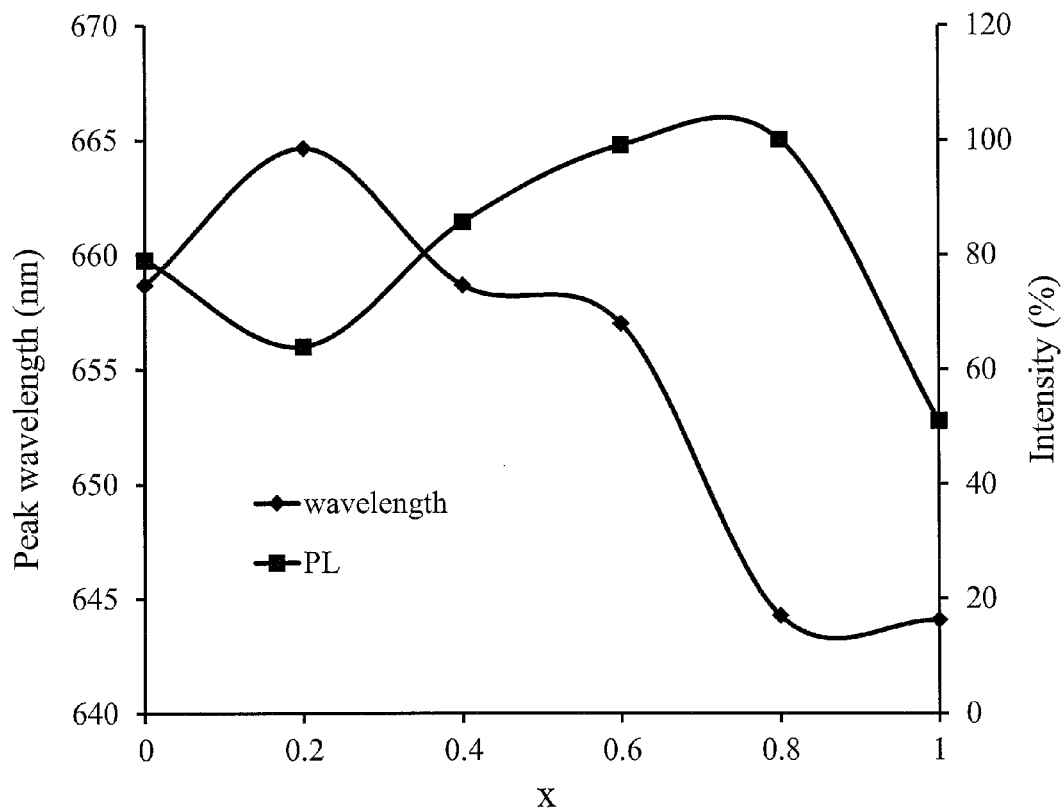

FIGS. 2A-2B depict emission spectra of $Eu_{0.05}(Sr_xCa_{(1-x)})_{2.95}Si_3Al_2N_8$, with different x values, as described by embodiments herein. FIG. 2B shows plots of peak emission wavelength and corresponding photoluminescent intensity as a function of x. The highest intensity for $Eu_{0.05}(Sr_xCa_{(1-x)})_{2.95}Si_3Al_2N_8$ is when x=0.8, having a Sr/Ca ratio of about 4, while the next highest is when x=0.6, having a Sr/Ca ratio of about 1.5. The peak wavelength shifts to shorter wavelengths with an increasing Sr concentration.

Figure 3A:
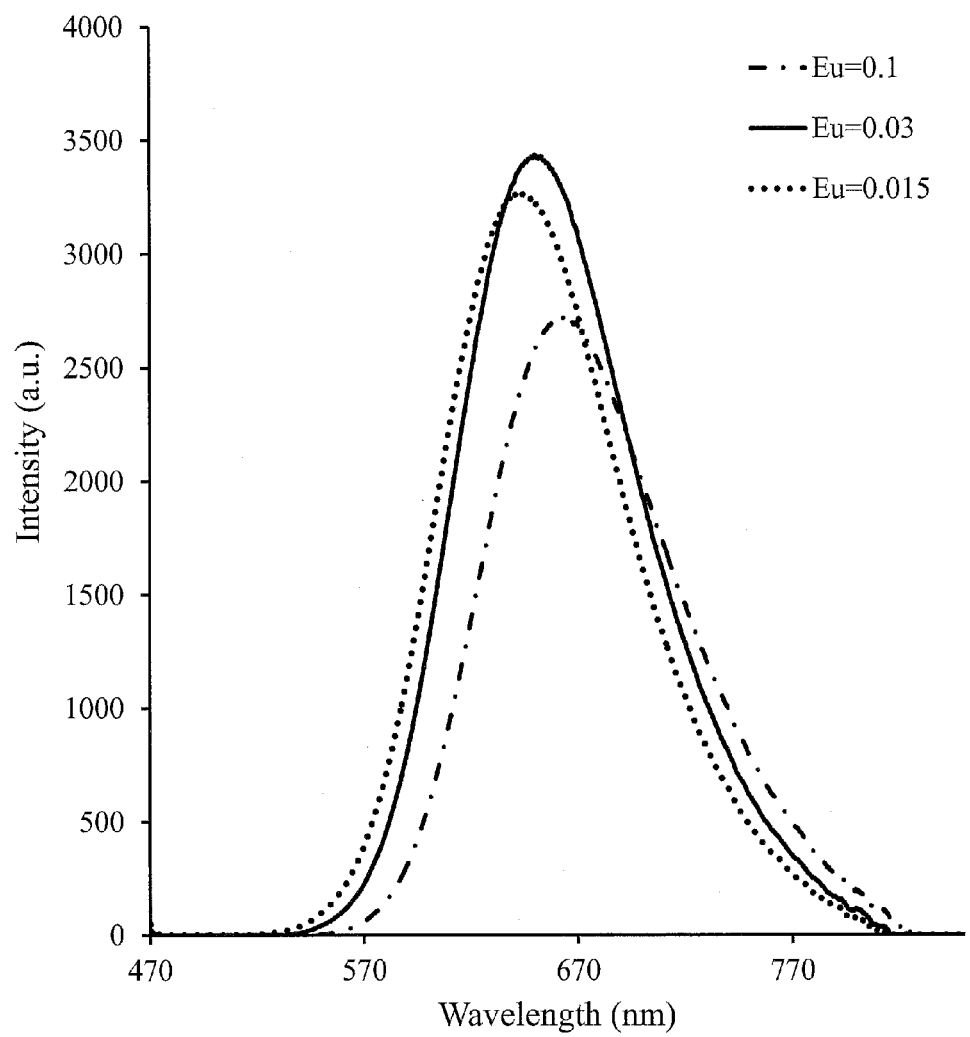
FIGS. 3A-3B depict emission spectra of $Eu_x(Sr_{0.8}Ca_{0.2})_{3-x}Si_3Al_2N_8$, with different x values, as described by embodiments herein.
Figure 3B:
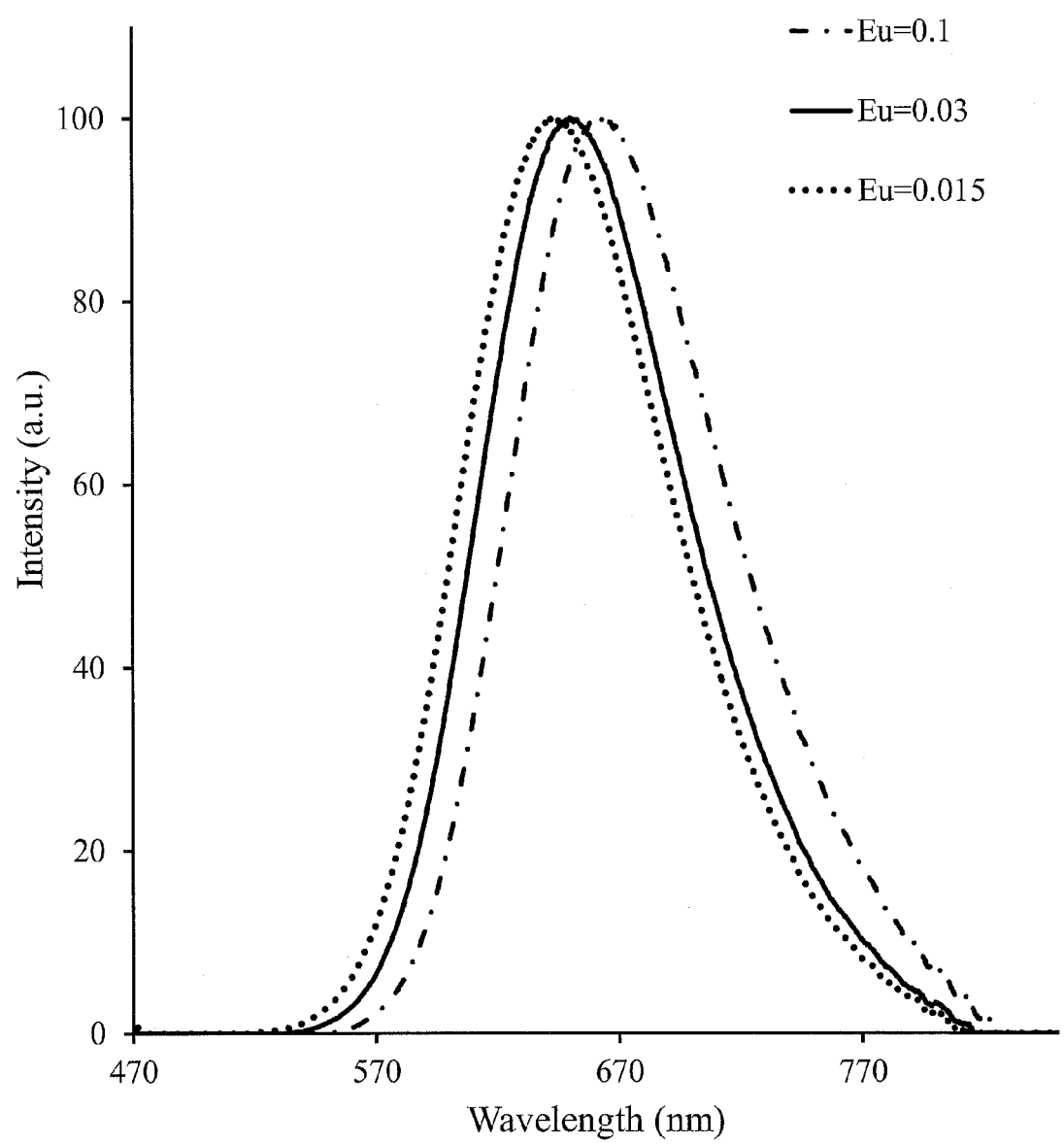
Figure 3C:
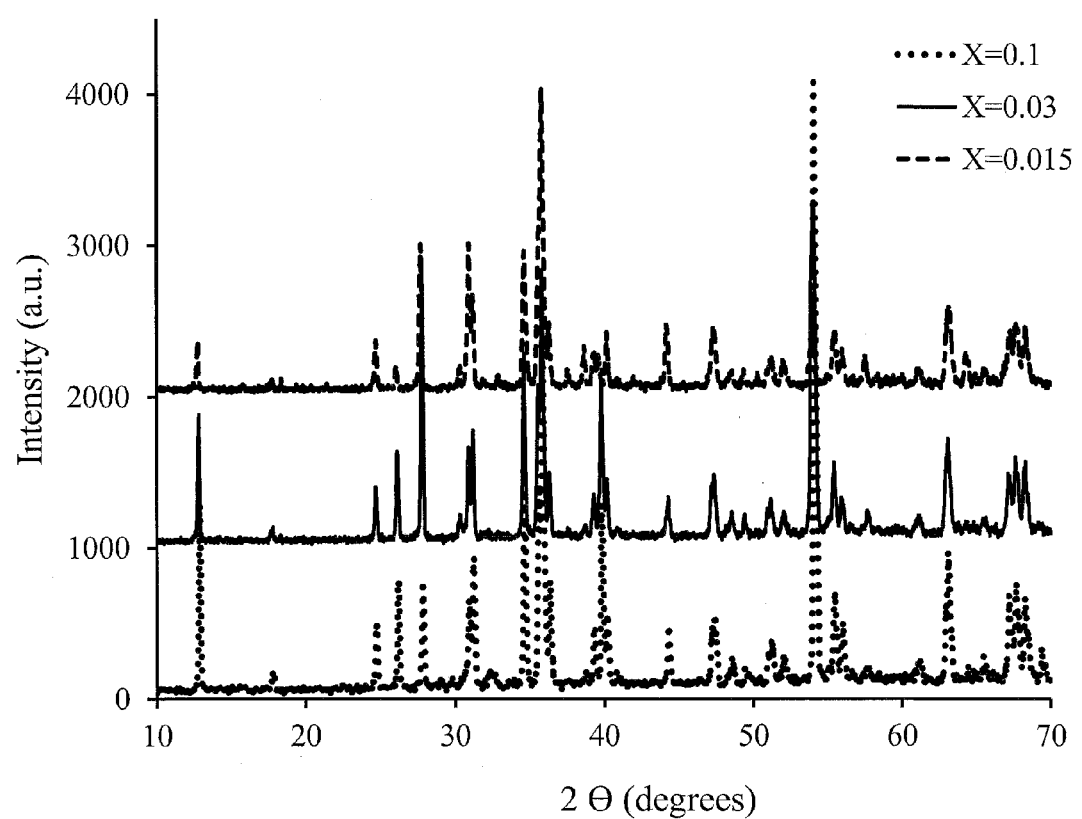
FIG. 3C depicts an XRD pattern of $Eu_x(Sr_{0.8}Ca_{0.2})_{3-x}Si_3Al_2N_8$, with different x values, as described by embodiments herein.

FIGS. 3A-3B depict emission spectra of $Eu_x(Sr_{0.8}Ca_{0.2})_{3-x}Si_3Al_2N_8$, with varying Eu concentrations (different x values). FIG. 3A depicts the emission spectra prior to exposing the phosphor to a sintering process while FIG. 3B depicts the emission spectra of the phosphor subsequent to being sintered in a nitride furnace at about 1,700° C. for about 7 hours. As the Eu concentration increases, the emission peak shifts to a longer wavelength. In FIG. 3A, the peaks for Eu=0.03 and 0.015 have the highest intensity and the lowest Eu concentration, respectively. After being sintered, as depicted in FIG. 3B, all of the spectra for different Eu concentrations have almost identical PL intensities. FIG. 3C depicts XRD patterns of $Eu_x(Sr_{0.8}Ca_{0.2})_{3-x}Si_3Al_2N_8$ at the different x values (or Eu concentrations) subsequent to being sintered in a nitride furnace at about 1,700° C. for about 7 hours. As expected, FIG. 3C shows that Eu doping at these low levels does not affect the crystal structure of the phosphor.

Some specific embodiments of the present invention that are based on the alpha silicon nitride compositions (a=0, b=0, c=3 and d=4), such as $Si_3N_4$:RE, are as follows.

$RE_xCa_{(0.5x-x')}Si_{(3-x)}Al_xN_4$ for Orange and Other Phosphors

In another embodiment, a phosphor (e.g., an orange phosphor) containing a nitride-based compound is represented by the chemical formula $RE_xCa_{(0.5x-x')}Si_{(3-x)}Al_xN_4$, wherein RE is at least one element selected from Eu, Ce, Pr, Nd, Sm, Gd, Tb, Dy, Ho, Er, Tm, Yb, or combinations thereof, $0.1<x<3$, and $0.0001 \le x' \le 0.2$, and wherein said nitride-based compound has the general crystalline structure of $\alpha$-$Si_3N_4$ (i.e. an $\alpha$-$Si_3N_4$ structure), Al substitutes for Si within said crystalline structure, and the Ca atoms are located within the crystalline structure substantially at the interstitial sites. In some examples, the chemical formula $RE_xCa_{(0.5x-x')}Si_{(3-x)}Al_xN_4$ is more narrowly represented wherein $0.1<x<3$ and $0.0001 \le x' \le 0.2$, more narrowly wherein $0.2 \le x \le 2$ and $0.001 \le x' \le 0.1$, more narrowly wherein $0.3 \le x \le 1.8$ and $0.005 \le x' \le 0.1$, and more narrowly wherein $0.3 \le x \le 1.8$ and x'=0.03.

In many examples, the phosphor contains a nitride-based compound represented by the chemical formula $Eu_xCa_{(0.5x-x')}Si_{(3-x)}Al_xN_4$, wherein $0.3 \le x \le 1.8$ and $0.005 \le x' \le 0.1$, such as wherein $0.3 \le x \le 1.8$ and x'=0.03, and wherein said nitride-based compound has the general crystalline structure of $\alpha$-$Si_3N_4$, Al substitutes for Si within said crystalline structure, and the Ca atoms are located within the crystalline structure substantially at the interstitial sites. In other examples, the nitride-based compound is represented by the chemical formula $Eu_{0.03}Ca_{(0.5x)}Si_{(3-x)}Al_xN_4$, wherein $0.1<x<3$, and wherein said nitride-based compound has the general crystalline structure of $\alpha$-$Si_3N_4$, Al substitutes for Si within said crystalline structure, and the Ca atoms are located within the crystalline structure substantially at the interstitial sites. In some examples, the phosphor activator contains Eu and at least one or more elements. Therefore, the RE is Eu and one or more elements selected from Ce, Pr, Nd, Sm, Gd, Tb, Dy, Ho, Er, Tm, Yb, or combinations thereof.

The phosphor containing $RE_xCa_{(0.5x-x')}Si_{(3-x)}Al_xN_4$ is generally enabled to emit an orange fluorescent light when irradiated with an excitation source, although the phosphor is also enabled to emit a fluorescent light of other colors. The fluorescent light emitted by the phosphor containing $RE_xCa_{(0.5x-x')}Si_{(3-x)}Al_xN_4$ may have a peak emission wavelength within a range from about 570 nm to about 680 nm under an excitation wavelength within a range from about 400 nm to about 480 nm. In some examples, the peak emission wavelength is within a range from about 580 nm to about 620 nm, more narrowly within a range from about 590 nm to about 600 nm. In other examples, the peak emission wavelength is within a range from about 590 nm to about 670 nm, more narrowly within a range from about 650 nm to about 670 nm.

Figure 4:
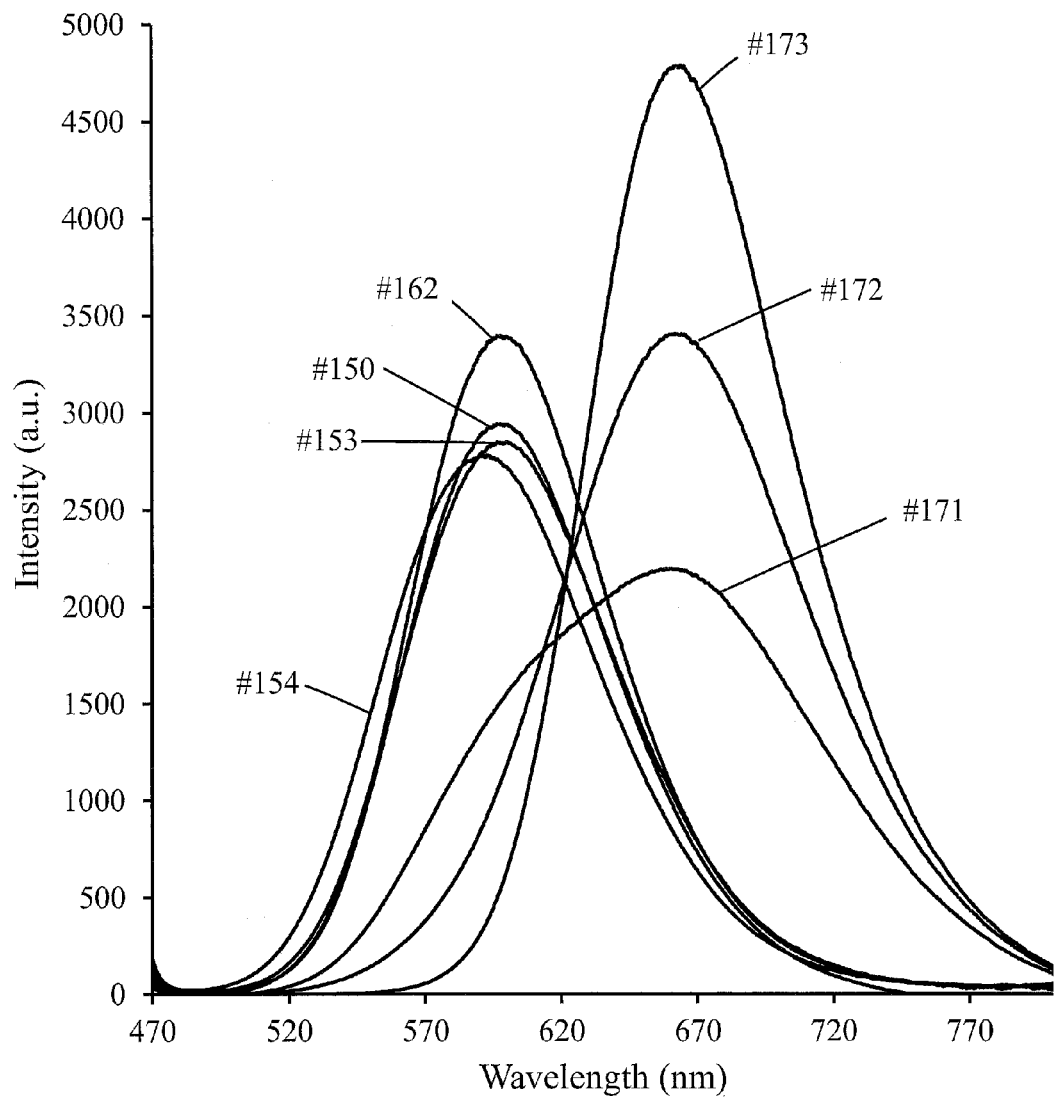
FIG. 4 depicts emission spectra of $Ca_{((3x/2)-0.03)}(Si_{(1-x)}Al_x)_3N_4Eu_{0.03}$, with different x values, as described by embodiments herein.

Table 1 includes data from emission spectra of $Ca_{((3x/2)-0.03)}(Si_{(1-x)}Al_x)_3N_4Eu_{0.03}$, with different x values, as described by embodiments herein. Note that $Ca_{((3x/2)-0.03)}(Si_{(1-x)}Al_x)_3N_4Eu_{0.03}$, which is equivalent to $Eu_{0.03}Ca_{(0.5x-0.03)}Si_{(3-x)}Al_xN_4$ if the x values listed in Table 1 are multiplied by 3. FIG. 4 depicts emission spectra of $Ca_{((3x/2)-0.03)}(Si_{(1-x)}Al_x)_3N_4Eu_{0.03}$, with different x values, as specified in Table 1. Table 2 includes data from emission spectra of $Eu_{0.025}Ca_{0.44}Si_{2.07}Al_{0.93}N_4$, as described by embodiments herein. Table 2 includes samples identified with "7 h" and "14 h"—this refers to 7 hours and 14 hours of sintering, respectively, at a temperature of about 1,700° C. in a nitride furnace. It is apparent from the data that the longer sintering time improves the photoluminescence intensity (and the crystallinity) of the phosphor. Table 2 also specifies two different sources of Eu—$EuCl_3$ and $EuF_3$. The $EuCl_3$ appears to improve the PL intensity and shift the peak to shorter wavelength.

TABLE 1

$Ca_{((3x/2)-0.03)}(Si_{1-x}Al_x)_3N_4Eu_{0.03}$

| Sample # | x | Peak wavelength (nm) | PL | CIEx | CIEy |
|---|---|---|---|---|---|
| 154 | 0.10 | 592 | 0.89 | 0.522 | 0.473 |
| 153 | 0.20 | 599 | 0.97 | 0.546 | 0.451 |
| 150 | 0.25 | 598 | 1.05 | 0.547 | 0.450 |
| 162 | 0.30 | 599 | 1.09 | 0.554 | 0.443 |
| 171 | 0.40 | 652 | 0.70 | 0.592 | 0.406 |
| 172 | 0.50 | 663 | 1.09 | 0.637 | 0.362 |
| 173 | 0.60 | 663 | 1.54 | 0.688 | 0.312 |

TABLE 2

$Ca_{0.44}(Si_{0.69}Al_{0.31})_3N_4Eu_{0.025}$

| Sample # | Eu type | PL | Peak wavelength (nm) | CIEx | CIEy | D50V (μm)† |
|---|---|---|---|---|---|---|
| 213-175-7h | $EuCl_3$ | 1.22 | 595.79 | 0.554 | 0.444 | 3.71 |
| 214-175-7h | $EuF_3$ | 1.07 | 598.96 | 0.566 | 0.433 | 4.62 |
| 213-175-14h | $EuCl_3$ | 1.27 | 595.62 | 0.553 | 0.445 | 5.56 |
| 214-175-14h | $EuF_3$ | 1.13 | 599.17 | 0.565 | 0.433 | 6.10 |

†D50V is the median particle size of the cumulative volume distribution.

$RE_xSr_{(0.5x-x')}Si_{(3-x)}Al_xN_4$ for Green and Other Phosphors

In another embodiment, a phosphor (e.g., a green phosphor) containing a nitride-based compound is represented by the chemical formula $RE_xSr_{(0.5x-x')}Si_{(3-x)}Al_xN_4$, wherein RE is at least one element selected from Eu, Ce, Pr, Nd, Sm, Gd, Tb, Dy, Ho, Er, Tm, Yb, or combinations thereof, $0.1<x<3$, and $0.0001 \le x' \le 0.2$, and wherein said nitride-based compound has the general crystalline structure of $\alpha$-$Si_3N_4$, Al substitutes for Si within said crystalline structure, and the Sr atoms are located within the crystalline structure substantially at the interstitial sites. In some examples, the chemical formula $RE_xSr_{(0.5x-x')}Si_{(3-x)}Al_xN_4$ is more narrowly represented wherein $0.1<x<3$ and $0.0001 \le x' \le 0.2$, more narrowly wherein $0.2 \le x \le 2$ and $0.001 \le x' \le 0.1$, more narrowly wherein $0.3 \le x \le 1.8$ and $0.005 \le x' \le 0.1$, and more narrowly wherein $0.3 \le x \le 1.8$ and x'=0.03.

In many examples, the phosphor contains a nitride-based compound represented by the chemical formula $Eu_xSr_{(0.5x-x')}Si_{(3-x)}Al_xN_4$, wherein $0.3 \leq x \leq 1.8$ and $0.005 \leq x' \leq 0.1$, such as wherein $0.3 \leq x \leq 1.8$ and $x'=0.03$, and wherein said nitride-based composition has the general crystalline structure of $\alpha$-Si$_3$N$_4$, Al substitutes for Si within said crystalline structure, and the Sr atoms are located within the crystalline structure substantially at the interstitial sites. In other examples, the nitride-based compound is represented by the chemical formula $Eu_{0.03}Sr_{(0.5x)}Si_{(3-x)}Al_xN_4$, wherein $0.1 < x < 3$, and wherein said nitride-based composition has the general crystalline structure of $\alpha$-Si$_3$N$_4$, Al substitutes for Si within said crystalline structure, and the Sr atoms are located within the crystalline structure substantially at the interstitial sites. In some examples, the phosphor activator contains Eu and at least one or more elements. Therefore, the RE is Eu and one or more elements selected from Ce, Pr, Nd, Sm, Gd, Tb, Dy, Ho, Er, Tm, Yb, or combinations thereof.

The phosphor containing $RE_xSr_{(0.5x-x')}Si_{(3-x)}Al_xN_4$ is generally enabled to emit a green fluorescent light when irradiated with an excitation source, although the phosphor is also enabled to emit a fluorescent light of other colors. The fluorescent light emitted by the phosphor containing $RE_xSr_{(0.5x-x')}Si_{(3-x)}Al_xN_4$ may have a peak emission wavelength within a range from about 530 nm to about 670 nm under an excitation wavelength within a range from about 400 nm to about 480 nm. In some examples, the peak emission wavelength is within a range from about 530 nm to about 650 nm, more narrowly within a range from about 540 nm to about 595 nm. In other examples, the peak emission wavelength is within a range from about 600 nm to about 670 nm, more narrowly within a range from about 625 nm to about 650 nm.

Figure 5:
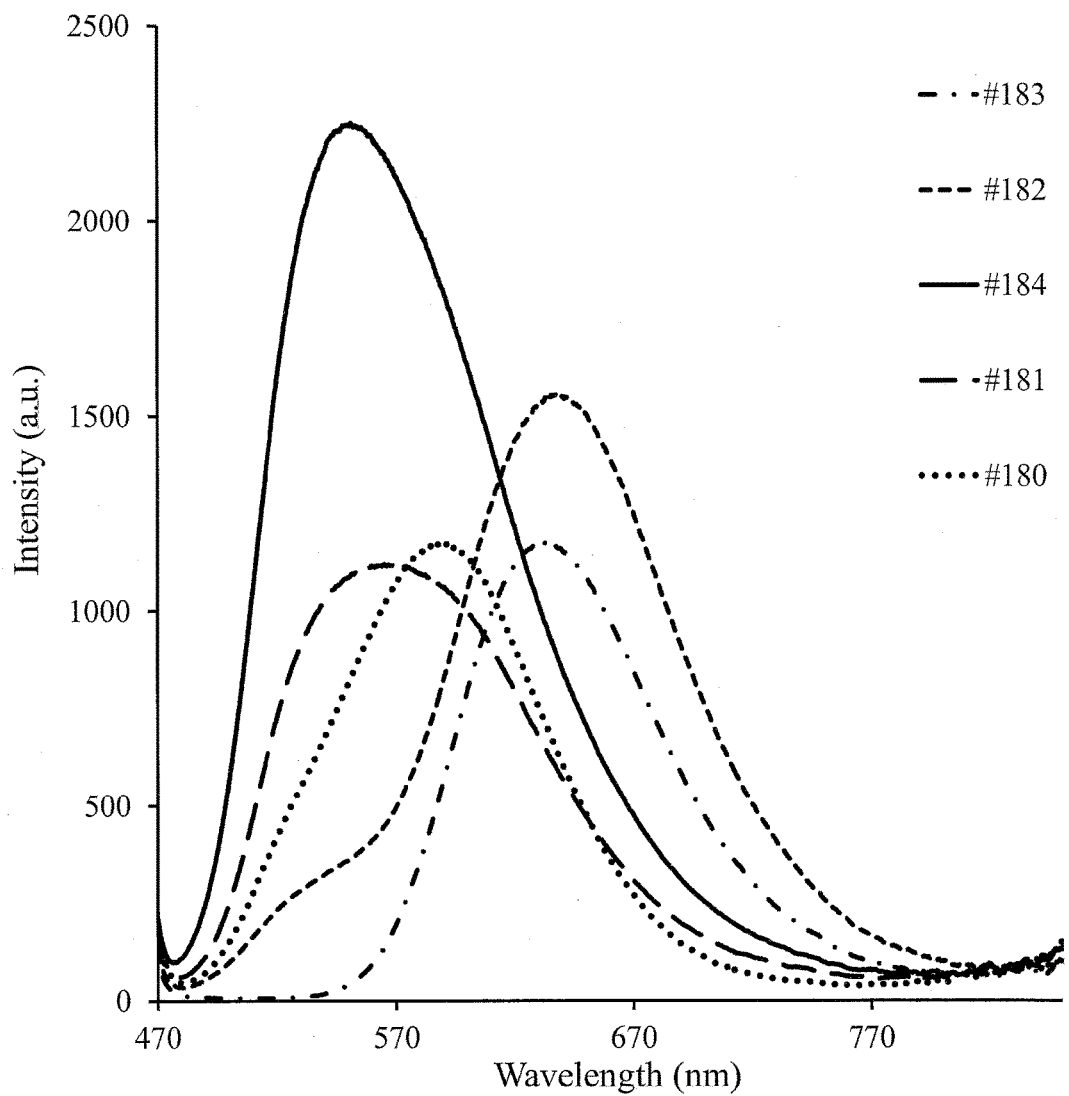
FIG. 5 depicts emission spectra of $Sr_{((3x/2)-0.03)}(Si_{(1-x)}Al_x)_3N_4Eu_{0.03}$, with different x values, as described by embodiments herein.

Table 3 includes data from emission spectra of $Sr_{((3x/2)-0.03)}(Si_{(1-x)}Al_x)_3N_4Eu_{0.03}$ with different x values, as described by embodiments herein. Note that $Sr_{((3x/2)-0.03)}(Si_{(1-x)}Al_x)_3N_4Eu_{0.03}$, which is equivalent to $Eu_{0.03}Sr_{(0.5x-0.03)}Si_{(3-x)}Al_xN_4$ if the x values listed in Table 3 are multiplied by 3. FIG. 5 depicts emission spectra of $Sr_{((3x/2)-0.03)}(Si_{(1-x)}Al_x)_3N_4Eu_{0.03}$, with different x values, as specified in Table 3.

TABLE 3

$Sr_{((3x/2)-0.03)}(Si_{1-x}Al_x)_3N_4Eu_{0.03}$

| Sample # | x | Peak wavelength (nm) | PL | CIEx | CIEy |
|---|---|---|---|---|---|
| 183 | 0.5 | 634 | 0.36 | 0.639 | 0.361 |
| 182 | 0.4 | 640 | 0.47 | 0.577 | 0.414 |
| 184 | 0.3 | 545 | 0.69 | 0.426 | 0.543 |
| 181 | 0.2 | 566 | 0.39 | 0.447 | 0.508 |
| 180 | 0.1 | 590 | 0.41 | 0.481 | 0.487 |

Exemplary Method for Forming Phosphors

In one embodiment, the raw materials Ca$_3$N$_2$, AlN, Si$_3$N$_4$, and EuX$_3$ (X=Cl or F) are sealed within an inert atmosphere such as nitrogen and/or argon, and maintained in such a state using a glove box. The raw materials are then weighed within the inert atmosphere, usually in a glove box, and then mixed using ordinary methods known in the art, including mixing with either a mortar or ball mill. The resulting mixture is placed in a crucible, which is then transferred to a tube furnace or a high-pressure furnace connected directly to the glove box. This is so that exposure of the mixed raw materials to an inert atmosphere is maintained. In the furnace, the mixed raw materials are heated to a temperature of about 1,400° C. to about 1,700° C. using a heating rate of about 10° C. per minute, and maintained at that temperature for a time anywhere from about 2 to about 12 hours. The sintered product is cooled to room temperature, and pulverized using known methods, including mortar, ball mill, and the like, to produce a powder with the desired composition.

Exemplary synthesis processes for related nitride phosphors that may be helpful while fabricating the phosphors described herein are further disclosed in the commonly assigned U.S. application Ser. No. 12/250,400, filed Oct. 13, 2008 and published as U.S. Pub. No. 2009/0283721, which is herein incorporated by reference.

Although the present invention has been particularly described with reference to certain embodiments thereof, it should be readily apparent to those of ordinary skill in the art that changes and modifications in the form and details may be made without departing from the spirit and scope of the invention.

What is claimed is:

1. A nitride-based phosphor comprising calcium, silicon, aluminum, nitrogen and europium, wherein said nitride-based composition has the general crystalline structure of $\alpha$-Si$_3$N$_4$, and Al substitutes for Si within said crystalline structure, and wherein said nitride-based phosphor absorbs radiation at a wavelength ranging from about 400 nm to about 480 nm and emits light with a photoluminescence peak emission wavelength within a range from about 592 nm to about 663 nm, wherein said nitride-based phosphor has a composition represented by the chemical formula $Ca_{(1.5x-0.03)}(Si_{(1-x)}Al_x)_3N_4Eu_{0.03}$, where x satisfies $0.1 \leq x \leq 0.6$, and calcium is located within said crystalline structure substantially at the interstitial sites.

2. The nitride-based phosphor of claim 1, wherein said orange-red nitride-based phosphor emits light having CIE(x) coordinates ranging from 0.522 to 0.688 and CIE(y) coordinates ranging from 0.473 to 0.312.

3. A nitride-based phosphor comprising strontium, silicon, aluminum, nitrogen and europium, wherein said nitride-based composition has the general crystalline structure of $\alpha$-Si$_3$N$_4$, and Al substitutes for Si within said crystalline structure, and wherein said nitride-based phosphor absorbs radiation at a wavelength ranging from about 400 nm to about 480 nm and emits light with a photoluminescence peak emission wavelength within a range from about 545 nm to about 640 nm, wherein said nitride-based phosphor has a composition represented by the chemical formula $Sr_{(1.5x-0.03)}(Si_{(1-x)}Al_x)_3N_4Eu_{0.03}$, where x satisfies $0.1 \leq x \leq 0.4$, and strontium is located within said crystalline structure substantially at the interstitial sites.

4. The nitride-based phosphor of claim 3, wherein said nitride-based phosphor emits light having CIE(x) coordinates ranging from 0.426 to 0.577 and CIE(y) coordinates ranging from 0.543 to 0.414.

* * * * *